(12) United States Patent
Oliver

(10) Patent No.: US 7,499,540 B2
(45) Date of Patent: *Mar. 3, 2009

(54) DEVICE HAVING PIVOTABLE HINGES

(75) Inventor: Mark W. Oliver, Fox River Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/027,177

(22) Filed: Dec. 30, 2004

(65) Prior Publication Data

US 2006/0148542 A1 Jul. 6, 2006

(51) Int. Cl.
*H04M 1/00* (2006.01)
*H04M 9/00* (2006.01)

(52) U.S. Cl. .............. 379/433.13; 379/433.01; 455/575.3

(58) Field of Classification Search ............ 379/433.13; 455/575.1, 90.3, 575.3, 550.1; 16/221, 223, 16/229–232, 242, 243, 303, 366–367, 319, 16/330

See application file for complete search history.

(56) References Cited

U.S. PATENT DOCUMENTS

| | | | |
|---|---|---|---|
| 4,086,519 A | 4/1978 | Persson | |
| 4,594,750 A * | 6/1986 | Carcas | 16/229 |
| 4,747,122 A | 5/1988 | Bhagat et al. | |
| 5,168,221 A | 12/1992 | Houston | |
| 5,189,632 A | 2/1993 | Paajanen et al. | |
| 5,274,882 A * | 1/1994 | Persson | 16/303 |
| 5,276,916 A | 1/1994 | Pawlish et al. | |
| 5,278,779 A | 1/1994 | Conway et al. | |
| 5,332,965 A | 7/1994 | Wolf et al. | |
| 5,494,447 A | 2/1996 | Zaidan | |
| 5,625,673 A | 4/1997 | Grewe et al. | |
| 5,661,632 A | 8/1997 | Register | |
| 5,682,529 A | 10/1997 | Hendry et al. | |
| 5,881,150 A * | 3/1999 | Persson | 379/433.13 |
| 5,926,119 A | 7/1999 | Lindeman et al. | |

(Continued)

FOREIGN PATENT DOCUMENTS

EP 1 429 524 A1 6/2004

(Continued)

OTHER PUBLICATIONS

"Motorola MPx one of First to Utilize new Windows Mobile 3003 Second Edition Software", http://www.motorola.com/mediacenter/news/detailpf/0,,4034_3395-23,00.html, Mar. 24, 2004.

*Primary Examiner*—Curtis Kuntz
*Assistant Examiner*—Phylesha Dabney
(74) *Attorney, Agent, or Firm*—Sylvia Chen; Keith J. Murphy

(57) ABSTRACT

In one embodiment, a device (100) having a first portion (102) and a second portion (104), the first or second portion being pivotably adjustable in two directions to reveal the other of the first or second portion, has a biaxially pivotable hinge (106) and a disengagable uniaxially pivotable hinge (108). The biaxially pivotable hinge (106) interconnects the first and second portions (102, 104). The uniaxially pivotable hinge (108) is capable of selectively (a) interconnecting the first and second portions (102, 104) and (b) releasing connection between the first and second portions (102, 104), the selectivity being dependent upon relative rotational position of the first portion (102) and the second portion (104) about the uniaxially pivotable hinge (108).

8 Claims, 8 Drawing Sheets

U.S. PATENT DOCUMENTS

| | | |
|---|---|---|
| 5,933,783 A | 8/1999 | Kawakami et al. |
| 6,002,946 A | 12/1999 | Reber et al. |
| 6,009,336 A | 12/1999 | Harris et al. |
| 6,014,573 A | 1/2000 | Lehtonen et al. |
| 6,088,240 A | 7/2000 | Steinhoff et al. |
| 6,115,616 A | 9/2000 | Halperin et al. |
| 6,249,672 B1 | 6/2001 | Castiel |
| 6,266,236 B1 | 7/2001 | Ku et al. |
| 6,385,463 B1 | 5/2002 | Lieberman et al. |
| 6,549,789 B1 | 4/2003 | Kfoury |
| 6,587,675 B1 | 7/2003 | Riddiford |
| 6,658,272 B1 * | 12/2003 | Lenchik et al. ........ 455/575.1 |
| 6,728,557 B1 * | 4/2004 | Tracy et al. ............ 455/575.3 |
| 6,766,181 B1 | 7/2004 | Newman et al. |
| 6,781,824 B2 | 8/2004 | Krieger et al. |
| 6,830,456 B2 | 12/2004 | Obermeyer |
| 6,839,576 B2 * | 1/2005 | Aagaard et al. ........ 455/575.1 |
| 6,976,861 B2 | 12/2005 | McWilliam et al. |
| 7,027,846 B2 * | 4/2006 | Pan ...................... 455/575.3 |
| 7,257,430 B2 | 8/2007 | Lenchik et al. |
| 2001/0019946 A1 | 9/2001 | Okuda |
| 2002/0032010 A1 | 3/2002 | Okuda et al. |
| 2003/0073414 A1 | 4/2003 | Capps |
| 2004/0067783 A1 * | 4/2004 | Lenchik et al. ........ 455/575.1 |
| 2004/0110529 A1 | 6/2004 | Watanabe et al. |
| 2004/0127266 A1 | 7/2004 | Aagaard et al. |
| 2004/0137940 A1 | 7/2004 | Matsunami |
| 2004/0198249 A1 | 10/2004 | Griffin |
| 2004/0204059 A1 | 10/2004 | Wong et al. |
| 2005/0148375 A1 | 7/2005 | DeLine |
| 2005/0257343 A1 * | 11/2005 | Gupte ........................ 16/330 |
| 2006/0048338 A1 * | 3/2006 | Lowry et al. .............. 16/367 |
| 2007/0050946 A1 * | 3/2007 | Shih et al. ................. 16/367 |

FOREIGN PATENT DOCUMENTS

| | | |
|---|---|---|
| EP | 1429524 B1 | 6/2004 |
| WO | 199819434 A1 | 5/1998 |

\* cited by examiner

DEVICE HAVING PIVOTABLE HINGES

BACKGROUND

This disclosure relates to devices with pivotable hinges, and more particularly, to cellular telephone/personal digital assistant combination devices having pivotable hinges.

Wireless electronic devices are ubiquitous in modern society. Particularly prevalent are cellular telephones, pagers and personal digital assistants. Many people require the functions of each of these devices to carry on their lives in a way that is acceptable to them. Such people have been "burdened" with carrying more than one wireless electronic device to achieve the desired blend of functionalities. Naturally, the wireless industry has been working to respond to already voiced or prospective complaints about the need to carry multiple devices. The obvious answer is to combine functionality in a single device. While the ultimate answer of making the combination may seem axiomatic, there are difficult issues surrounding the implementation thereof. Such devices must remain aesthetically pleasing and ergonomically effective.

In one example of a dual mode device, a Motorola MPX cellular telephone and personal digital assistant is openable in two directions to be effectively utilized in two distinct modes. The MPX device has a hinge assembly that connects a first portion of the device and a second portion of the device. The hinge assembly allows movement of the two portions of the device relative to one another in two distinct directions such that the device can be used for different purposes at the different positions. The device requires separate actuation of components to allow movement of the first portion relative to the second portion in one of the possible directions of movement. More specifically, in order to open the device as a telephone, one merely needs to impart an opening force to one or the other of the first and second portions whereas to open the device as a personal digital assistant (PDA), the user is required additionally to actuate a release button simultaneous to imparting an opening force in the desired direction. While the MPX device operates effectively, there is an opportunity for further simplification of operation.

BRIEF DESCRIPTION OF DRAWINGS

Refer now to the figures, which are exemplary, not limiting, and wherein like elements are numbered alike in several figures and, as such may not be discussed in relation to each figure.

DETAILED DESCRIPTION

Disclosed herein are devices with pivotable hinges. In one embodiment, a device has a first portion and a second portion. The first portion is pivotably adjustable in two directions relative to the second portion. The device includes a biaxially pivotable hinge and a disengagable uniaxially pivotable hinge. The biaxially pivotable hinge interconnects the first and second portions. The uniaxially pivotable hinge is capable of selectively (a) interconnecting the first and second portions and (b) releasing connection between the first and second portions, the selectivity being dependent upon a rotational position of the first portion relative to the second portion about the uniaxially pivotable hinge.

Further disclosed herein is a telephone/personal digital assistant combination device including a display housing and a keypad housing, plus a first hinge interconnecting the display housing and the keypad housing that is pivotable in at least two directions. A second hinge further interconnects the display housing and the keypad housing, the second hinge being automatically disengagable when the display housing is at less than a selected pivot angle relative to the keypad housing.

Yet further disclosed herein is a method for pivotably adjusting a first portion of a device in two directions relative to a second portion of the device. The method includes rotating the first portion relative to the second portion around a first pivoting axis of a biaxially pivotable hinge and a uniaxially pivotable hinge to be in a closed position or a first open position; and rotating the first portion relative to the second portion around a second pivoting axis of the biaxially pivotable hinge to be in the closed position or a second open position.

The above described and other features are exemplified by the following detailed description.

Figure 1:
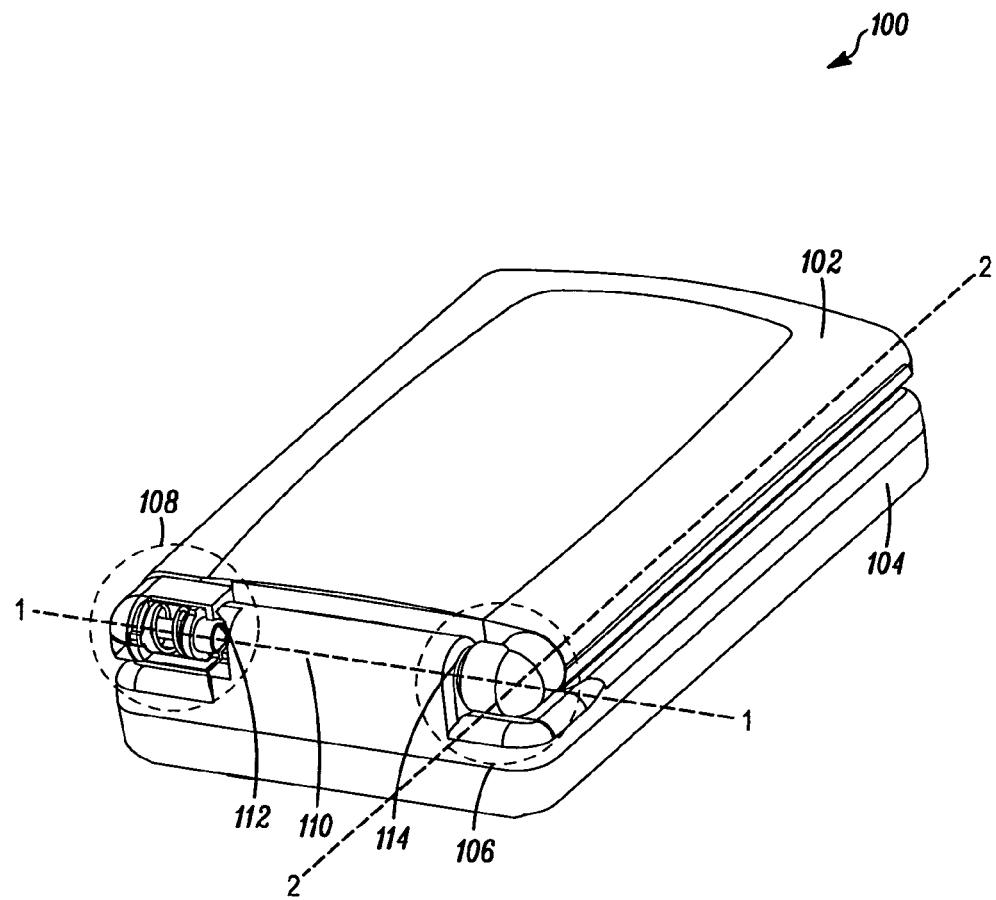
FIG. 1 is a perspective partial cut-away view of one embodiment of a device having pivotable hinges in a closed position.

FIG. 1 is a perspective partial cut-away view of one embodiment of a device having pivotable hinges in a closed position. In this embodiment, a device 100 having a first portion 102 and a second portion 104 includes a biaxially pivotable hinge 106 and a uniaxially pivotable and selectively disengagable hinge 108. The device 100 further has a housing portion 110 having a first end 112 and a second end 114. The housing portion 110 is in the form of a cylindrical portion extending from the second portion 104. The first portion 102 has a sunken part 116 (shown in FIGS. 7-8) for receiving the housing portion 110. The device 100 is openable in two directions: (1) along an axis 1-1 and (2) along an axis 2-2. When the device is opened along axis 1-1, both hinges 106 and 108 are engaged and employed. When the device opens along axis 2-2, only hinge 106 is engaged and employed, and hinge 108 is disengaged.

Figure 2:
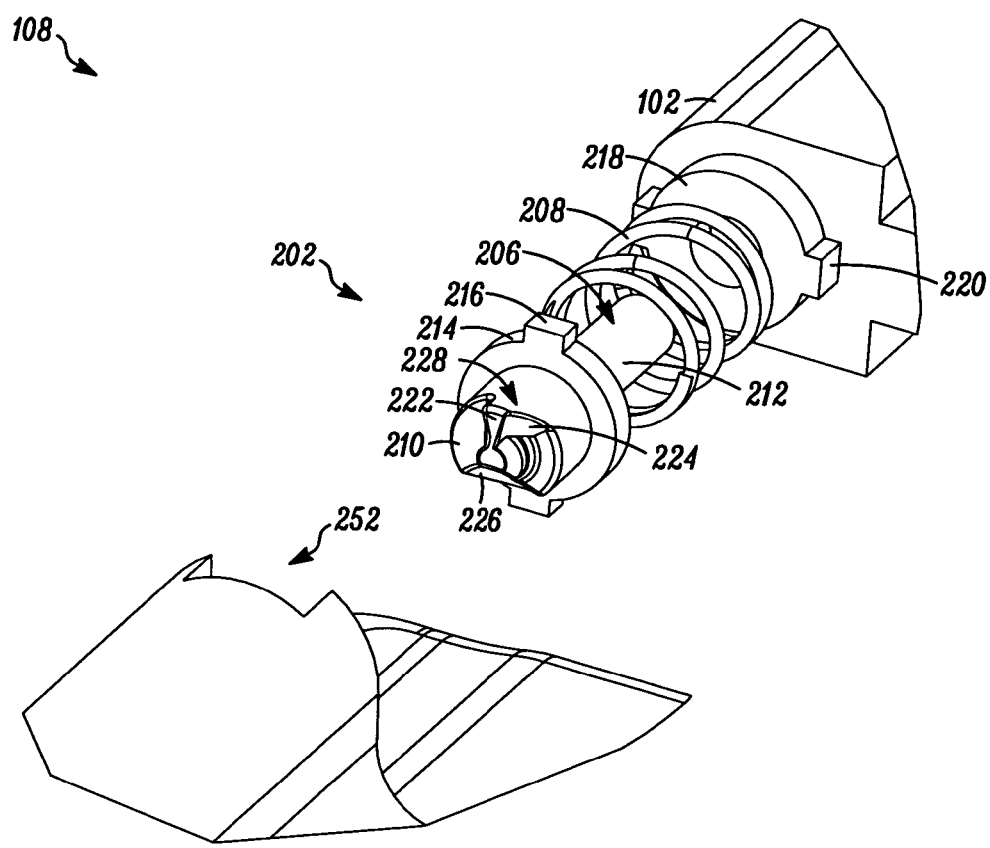
FIG. 2 is an exploded perspective view of a male portion of one embodiment of a uniaxially pivotable hinge.
Figure 3:
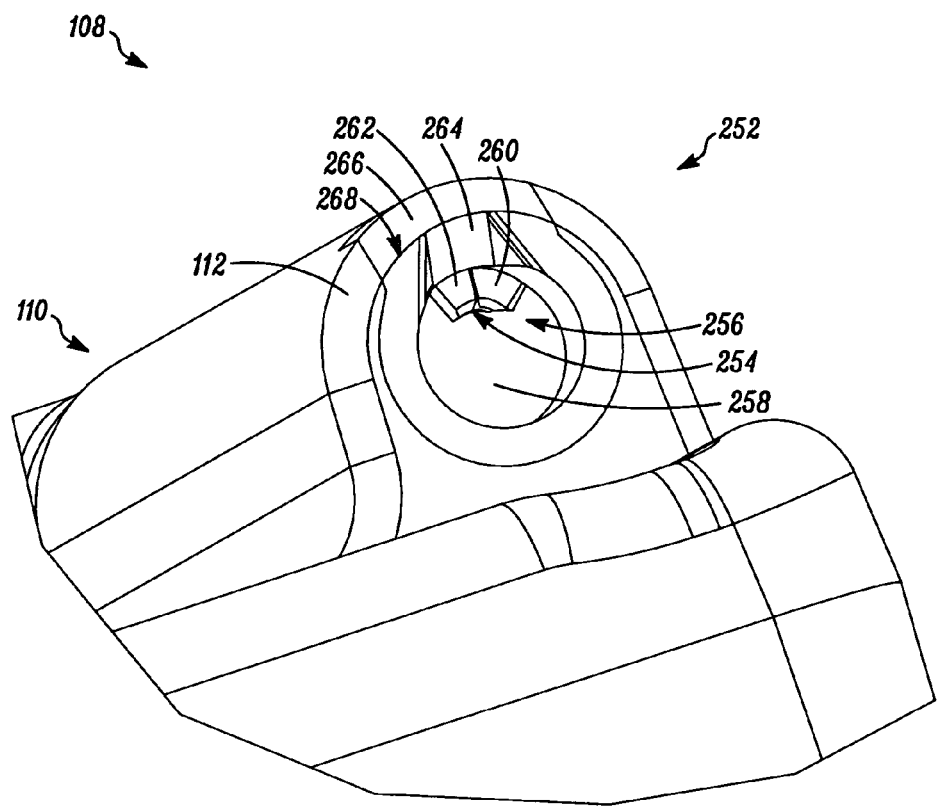
FIG. 3 is a perspective view of a female portion of the embodiment of the uniaxially pivotable hinge illustrated in FIG. 2.

FIG. 2 is an exploded perspective view of a male portion of one embodiment of a uniaxially pivotable hinge; FIG. 3 is a perspective view of a female portion of the embodiment of the uniaxially pivotable hinge illustrated in FIG. 2. These two FIGS. should be considered simultaneously. The uniaxially pivotable hinge 108, in one embodiment, includes a male portion 202 and a female portion 252. The male portion 202 has an actuator 206 and a biasing member 208, which may be a coil spring disposed around the actuator 206. The actuator 206 may be a one-piece integral unit made of two main sections: a first part 210 and a second part 212 separated by a raised collar 214. The actuator 206 may have a circular cross section with the first part 210 having a diameter greater than the second part 212. The raised collar 214 carries a radial lug 216 for connecting the male portion 202 to the first portion 102 of the device 100. Optionally, the male portion 202 may have a spacer 218 at an end of the second part 212 of the actuator 206 opposite to an end of the second part 212 having the raised collar 214. The spacer 218 may have a protruding boss 220 that can be matingly received by the first portion 102 to further strengthen the connection of the male portion 202 to the first portion 102. In other embodiments, the spacer 218 may be absent or may be in the form of an extension of the first portion 102.

Referring to FIG. 2, the first part 210 of the actuator 206 has an engagement interface profile with an actuator stop surface 222 and an actuator ramp surface 224. Actuator stop surface 222 and actuator ramp surface 224 interact with surfaces on the female portion 252 discussed hereunder. Further, first part 210 includes a chamfer surface 226. Chamfer surface 226 interacts with female portion 252 to urge actuator 206 against biasing member 208 to facilitate engagement between the male and female portions of the hinge when device 100 is being closed from an open position about axis 2-2. Together, the noted surfaces make an engagement interface profile 228.

Referring to FIG. 3, the female portion 252 defines a complementary profile 254 located at a first end 112 of housing 110. The complementary profile is made up of the structure discussed in this paragraph and further includes a first receiving space 256. First receiving space 256 includes an end surface 258, which defines a limit to possible depth of engagement between actuator 206 and female portion 252. Extending (upwardly or outwardly depending on perspective) from surface 258 is a ramp structure 260 that terminates at a land 262. Ramp structure 260 and land 262 interact with ramp surface 224 and stop surface 222 of first part 210 of actuator 206, respectively. When the device 100 is in the closed position, stop surface 222 of actuator 206 is in contact with land 262, preventing full depth engagement of male portion 202 with female portion 252. Upon opening of device 100 about axis 1-1, stop surface 222 slides laterally from land 262 allowing contact between ramp surface 224 and ramp structure 260 (of female portion 252). Such contact allows for a smooth transition of actuator 206 from a partial engagement with female portion 252 to a full engagement with female portion 252 where actuator 206 is seated deeply within female portion 252 thus strengthening the uniaxially pivotable hinge. This provides a "solid feel" when the device 100 is opened about axis 1-1.

Further features of female portion 252 include a bevel 264, which is an angularly disposed surface extending from land 262 in a direction that will cause actuator 206 to compress biasing member 208 when the device 100 is opened about axis 2-2. The bevel 264 interacts with stop surface 222 during an opening operation of device 100 about axis 2-2. More specifically, actuator 206 is urged against the bias of biasing member 208 by being urged up bevel 264 due to an opening force applied by a user. When actuator 206 exceeds a peak 268, the device 100 opens easily without resistance.

The bevel 264 also acts to retain the device 100 in a closed position when a user does not provide a specific opening force, because biasing member 208 and bevel 264 tend to urge the device to a closed position. When closing the device 100, that was previously opened about axis 2-2, a strike 266 urges actuator 206 against biasing member 208 to allow closure of the device. As actuator 206 passes peak 268 of strike 266, and encounters bevel 264, the biasing member 208 causes actuator 206 to move toward land 262 thereby urging device 100 to the fully closed position In order to understand the disengagable action of the uniaxially pivotable hinge 108, a discussion of the biaxially pivotable hinge 106 will be helpful.

Figure 4:
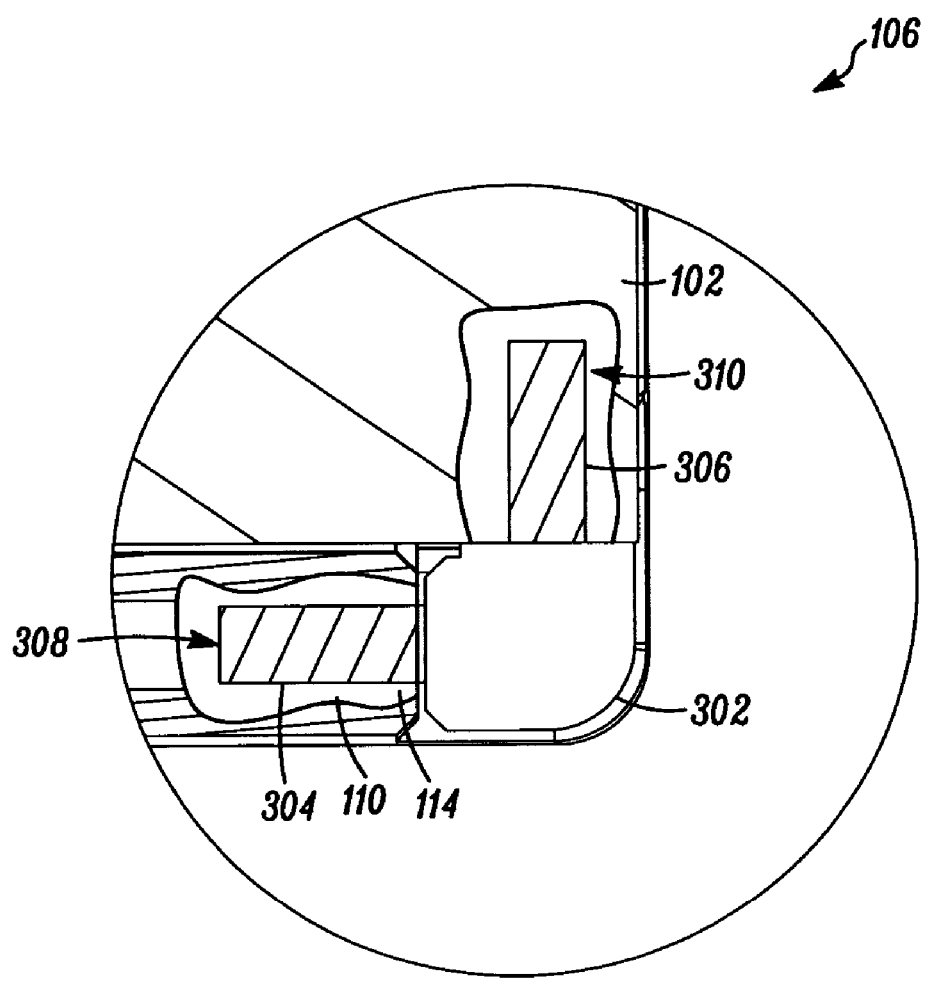
FIG. 4 is a broken away view of one embodiment of a biaxially pivotable hinge in cross-section.

FIG. 4 is a broken away view of one embodiment of a biaxially pivotable hinge in cross-section. The biaxially pivotable hinge 106 has a central member 302 having a first connecting member 304 and a second connecting member 306. The second end 114 of the housing 110 may have a second receiving space 308 adapted to matingly receive the first connecting member 304. Also, the first portion 102 may have a third receiving space 310 adapted to matingly receive the second connecting member 306. Pivoting of portion 102 is possible about a pivoting axis of each of connecting member 304 and connecting member 306 at individual times (i.e., one must choose the pivoting axis about which portion 102 is to be pivoted; they cannot both be actuated together).

Figure 5:
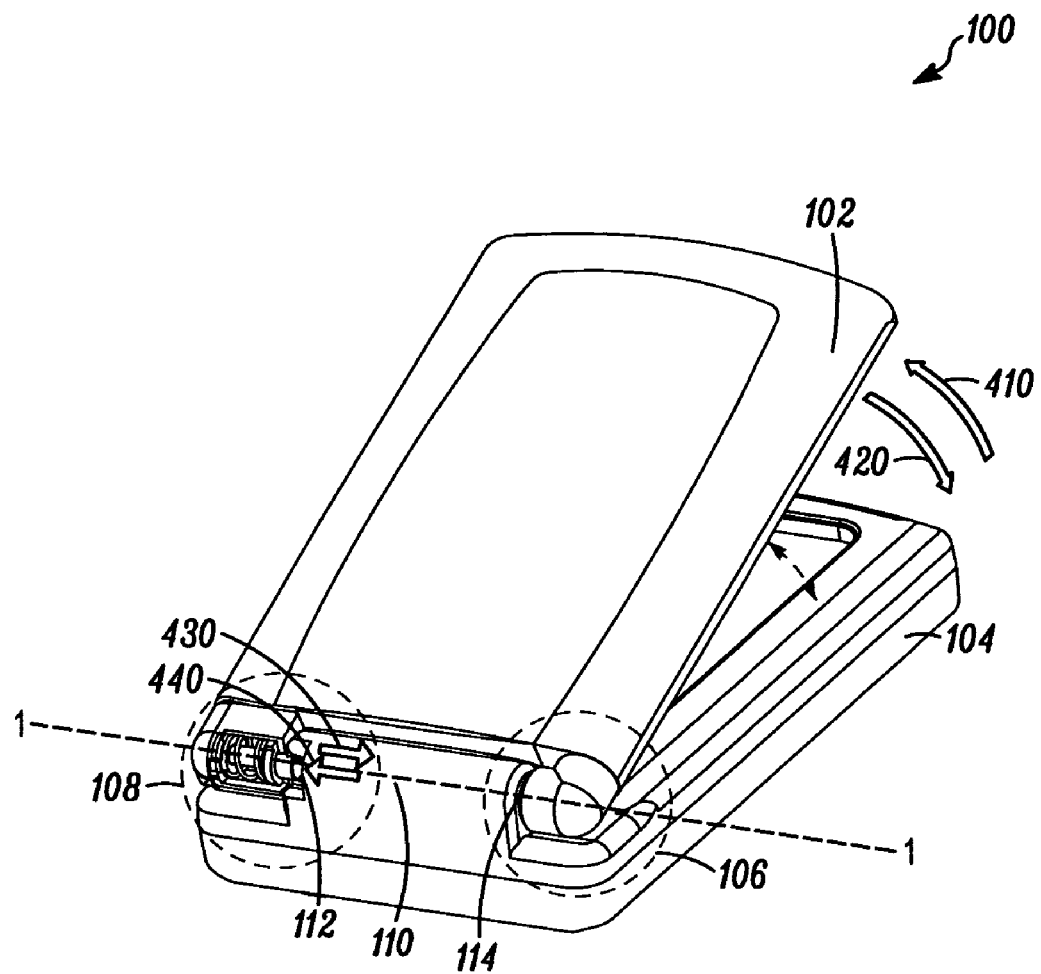
FIG. 5 is a perspective view of one embodiment of a device having pivotable hinges in a first open position.

FIG. 5 is a perspective view of one embodiment of a device having pivotable hinges in a first open position in one embodiment. The first portion 102 can be rotated relative to the second portion 104 about the first pivoting axis 1-1 thereby utilizing both the uniaxially pivotable hinge 108 and biaxially pivotable hinge 106. The device 100 may be in a closed position (i.e., a relative angle of about 0 degrees between the first portion 102 and the second portion 104, measured perpendicularly to axis 1-1, as is illustrated in FIG. 1) or may be in a first open position (i.e., a relative angle of greater than 0 degrees between the first portion 102 and the second portion 104, measured perpendicularly to axis 1-1, as is illustrated in FIG. 5).

Desirably, the depth of engagement increases smoothly with an increase in the relative angle between the first portion 102 and the second portion 104 so that "notching" movement is avoided. As noted above, this is facilitated by the interaction of ramp surface 224 and ramp structure 260 (FIGS. 2 and 3). Referring still to FIG. 5, when the first portion 102 is rotated relative to the second portion 104 about the first pivoting axis 1-1 from the closed position to the first open position along a direction of an arrow sign 410, the actuator 206 having the surfaces identified above simultaneously rotates with the first portion 102 and is pushed in a direction of an arrow sign 430 by the biasing member 208, thereby increasing the depth of engagement of the male portion 202 with the female portion 252. When the first portion 102 is rotated relative to the second portion 104 around the first axis 1-1 from the first open position to the closed position along a direction of an arrow sign 420, the actuator 206 simultaneously rotates with the first portion 102 and moves in a direction of an arrow sign 440 (opposite the direction of engagement, i.e., opposite to the direction of the arrow sign 430), thereby decreasing the depth of engagement of the male portion 202 with the female portion 252. The decreased depth of engagement increases the releasability of the connection between the first portion 102 and the second portion 104 when the device is opened to pivot about second connecting member 306 (axis 2-2 in FIG. 1) shown in FIG. 4.

In the closed position shown in FIG. 1, the male portion 202 shown in FIG. 2 and the female portion 252 shown in FIG. 3 have a very low depth of engagement. Specifically where contact occurs between stop surface 222 and land 262, the force at this interface is provided by biasing member 208 and is calculated to be sufficient to cause male portion 202 to act as a detent. The detent is intended to retain the device in the closed position but to easily release (disengage the male and female portions of the uniaxially pivotable hinge 108) upon force from a user to open the device to a second open position. This enables rotatability about the axis 2-2.

Figure 6:
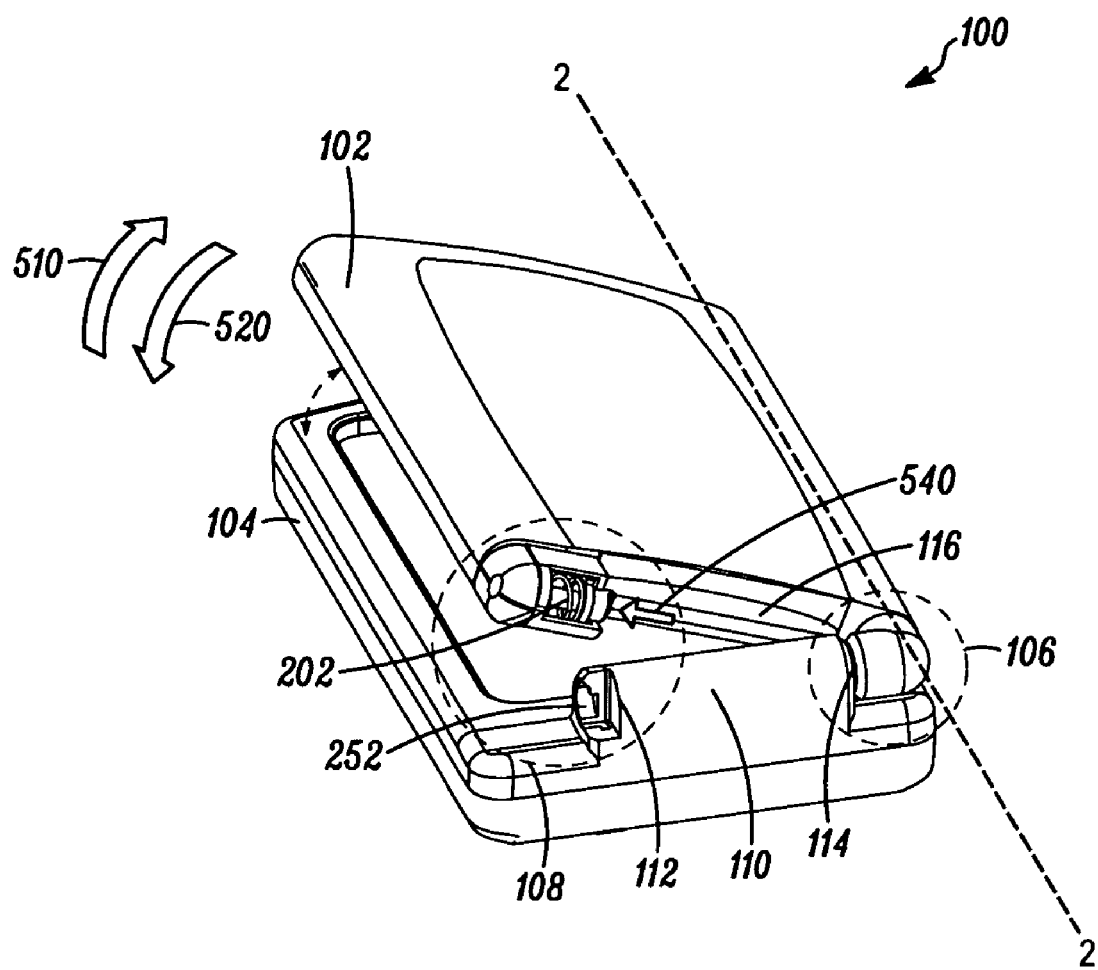
FIG. 6 is a perspective view of one embodiment of a device having pivotable hinges in a second open position.

FIG. 6 is a perspective view of one embodiment of a device having pivotable hinges in a second open position. The first portion 102 can be rotated relative to the second portion 104 around the second axis 2-2 to be in the closed position (i.e., an angle of about 0 degrees between the first portion 102 and the second portion 104, measured perpendicularly to axis 2-2, as is illustrated in FIG. 1) or a second open position (i.e., an angle of greater than 0 degrees between the first portion 102 and the second portion 104, measured perpendicularly to axis 2-2, as is illustrated in FIG. 6)

An opening force imparted by a user in a direction of arrow sign 510 tending to pivot the first portion 102 about axis 2-2 relative to second portion 104 urges the male portion 202 out of engagement with the female portion 252 by urging actuator 206 to ride up bevel 264 and over peak 268. When the first portion 102 is rotated relative to the second portion 104 around the second axis 2-2 from the second open position to the closed position along the direction of an arrow sign 520, the actuator 206 moves in a direction of an arrow sign 540, moving up chamfer surface 226, over peak 268 and down bevel 264 thereby engaging the male portion 202 with the female portion 252.

Figure 7:
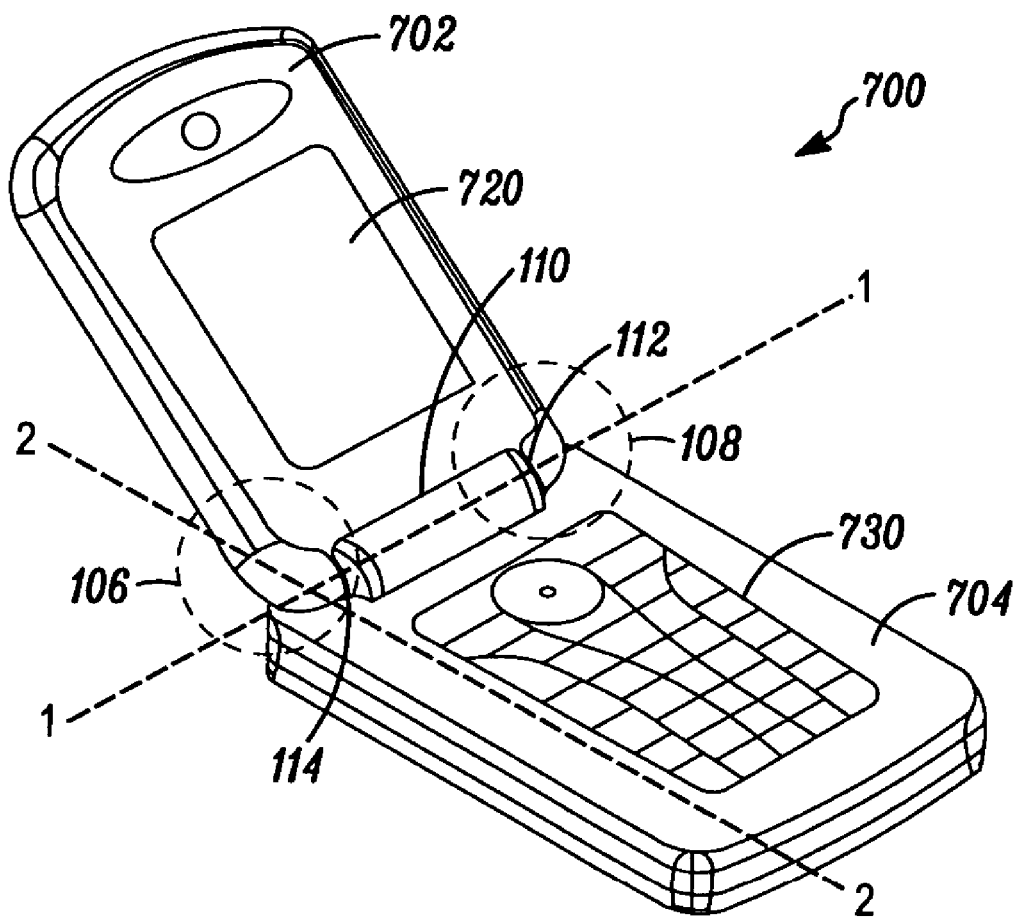
FIG. 7 is a perspective view of one embodiment of a cellular telephone/PDA combination device in a cellular telephone mode

FIG. 7 is a perspective view of one embodiment of a cellular telephone/PDA combination device in a cellular telephone mode. The dual hinge system (i.e., the system having the biaxially pivotable hinge 106 and uniaxially pivotable hinge 108) can be employed in a wide variety of devices for pivotably adjusting the devices in two directions to be effectively utilized in two distinct modes. Referring to FIG. 7, in one embodiment, the device is a cellular telephone/personal digital assistant (PDA) combination device 700. The combination device has a display housing 702 as a first portion, a keypad housing 704 as a second portion, a biaxially pivotable hinge 106 and a uniaxially pivotable hinge 108. The display housing 702 can have a display screen 720 and the keypad housing 704 can have a keypad 730. The keypad 730 may be a standard twelve key keypad such as used on telephones and cellular telephones or may have additional function buttons or other inputs that may be used to provide additional functionality to the combination device. The combination device 700 pivots on the first axis 1-1 to the first open position to be used in a cellular telephone mode, as is illustrated in FIG. 7, and pivots on the second axis 2-2 to the second open position to be used in a PDA mode, as is illustrated in FIG. 8.

For usage in the cellular telephone mode, it is particularly advantageous to strengthen the uniaxially pivotable hinge 108. As one of skill in the art will recognize, the combination device 700, when in cellular telephone mode, bridges a user's ear and mouth and is held against the head of the user. Pressure on the combination device 700 from the user's hand or shoulder is exerted across the hinge urging it beyond its maximum angular position. If the uniaxially pivotable hinge 108 did not strengthen (i.e., extend more deeply into the female portion 252) with opening of the device in cellular telephone mode, the phone would "feel" flimsy and the hinge might be overextended.

Figure 8:
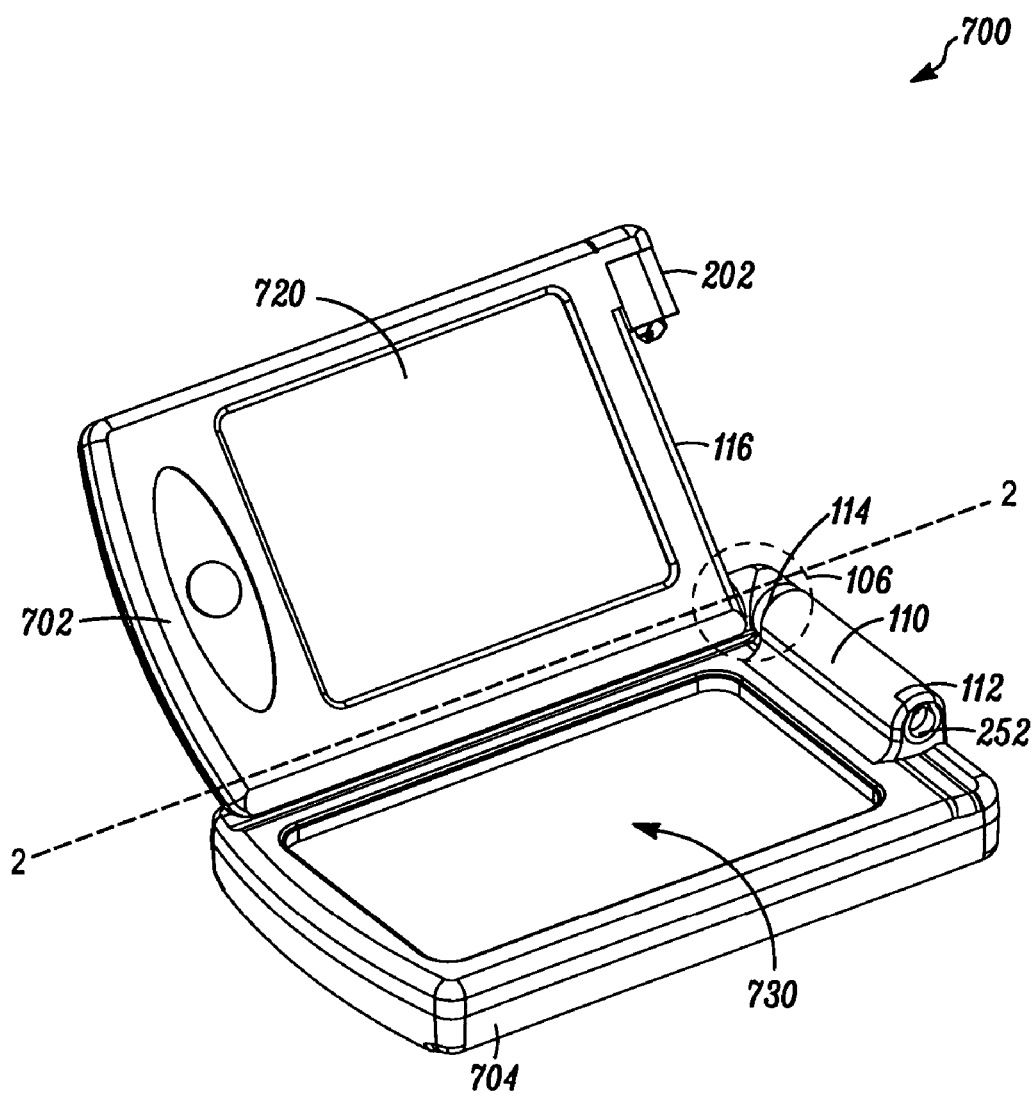
FIG. 8 is a perspective view of one embodiment of a cellular telephone/PDA combination device in a PDA mode.

FIG. 8 is a perspective view of one embodiment of a cellular telephone/PDA combination device in a PDA mode. As discussed earlier, when describing the embodiment in FIG. 5, the male portion 202 and the female portion 252 of the uniaxially pivotable hinge 108 are disengaged when the combination device is in the PDA mode (See FIG. 7).

It is to be understood that the foregoing discussion of one embodiment of the invention is not to be construed as limiting and it is contemplated that the uniaxially pivotable hinge may be operationally reversed such that the male portion is rotationally movable and axially stationary while the female portion is axially moveable (and rotationally stationary). Moreover, the female portion can be rotationally movable while the male portion is rotationally fixed with axial movement being on either component. Further, in some embodiments it may be desirable to render both male and female portions axially moveable. Following exposure to the teachings in this specification, one of ordinary skill in the art is capable of easily constructing the alternate embodiment noted.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A cellular telephone/personal digital assistant combination device having a first portion and a second portion, the first portion being pivotably adjustable in two directions relative to the second portion, the device comprising:
   a biaxially pivotable hinge interconnecting the first portion and the second portion; and
   a disengagable uniaxially pivotable hinge capable of selectively (a) interconnecting the first portion and the second portion and (b) releasing connection between the first portion and the second portion, the selectivity being dependent upon a rotational position of the first portion relative to the second portion about the uniaxially pivotable hinge,
   wherein the uniaxially pivotable hinge comprises:
      a female portion; and
      a male portion, wherein the male portion comprises an actuator having an engagement interface profile, which, cooperates with a complementary profile of the female portion, wherein the depth of engagement of the male portion with the female portion increases from a disengaged position to a fully engaged position with increase in rotational separation of the first portion relative to the second portion measured perpendicularly to an axial direction to the second hinge.

2. The device as claimed in claim 1, wherein the engagement interface profile includes a stop surface and a ramp surface that interacts with a land and a ramp structure of the complementary profile, to compress or allow expansion of a biasing member, which in turn decreases or increases depth of engagement of the male portion with the female portion, respectively.

3. The device as claimed in claim 2, wherein the biasing member is a coil spring.

4. The device as claimed in claim 1, wherein the male portion includes structure rendering it pivotable with one of the first portion and the second portion.

5. A cellular telephone/personal digital assistant combination device comprising:
   a display housing;
   a keypad housing;
   a first hinge interconnecting the display housing and the keypad housing that is pivotable in at least two directions; and a second hinge interconnecting the display housing and the keypad housing, the second hinge having a first portion and a second portion said first portion being automatically disengagable from said second portion when the display housing is at less than a selected pivot angle relative to the keypad housing, wherein the first portion of the second hinge and the second portion of the second hinge are biased into engagement with each other, further wherein the first portion comprises:

an engagement interface profile which cooperates with a complementary profile of the second portion, wherein the depth of engagement of the first portion with the second portion increases from a disengaged position to a fully engaged position with increase in rotational separation of the display housing from the keypad housing measured perpendicularly to an axial direction to the second hinge.

6. The combination device as claimed in claim 5, wherein one of the first portion and the second portion of the second hinge is disposed at one of the display portion and the keypad portion, and the other of the first portion and the second portion is disposed at an other of the first portion and the second portion.

7. The combination device as claimed in claim 5, wherein the combination device is in a cellular telephone mode when the display housing is rotated relative to the keypad housing about an axis of the second hinge.

8. The combination device as claimed in claim 5, wherein the engagement interface profile of the first portion which when cooperating with the complementary profile of the second portion urges an actuator out of engagement with the second portion upon rotational separation of the display housing from the keypad housing in a direction transaxial to the second hinge.

* * * * *